US007470405B2

(12) United States Patent
Knopf et al.

(10) Patent No.: US 7,470,405 B2
(45) Date of Patent: Dec. 30, 2008

(54) MICROCHANNEL REACTOR WITH ACTIVE OSCILLATORY FORCING

(75) Inventors: Frederick Carl Knopf, Baton Rouge, LA (US); Virbert Paul Rodriguez, Brusly, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 585 days.

(21) Appl. No.: 11/042,439

(22) Filed: Jan. 25, 2005

(65) Prior Publication Data
US 2006/0165570 A1    Jul. 27, 2006

(51) Int. Cl.
  *B01J 10/00* (2006.01)
(52) U.S. Cl. .................. 422/129; 422/220; 422/236
(58) Field of Classification Search ............... 422/103, 422/100, 129, 127, 220, 236; 436/180
See application file for complete search history.

(56) References Cited

U.S. PATENT DOCUMENTS

| 6,906,317 | B2 * | 6/2005 | Bateman et al. | 250/281 |
|---|---|---|---|---|
| 7,011,797 | B2 * | 3/2006 | Bakke | 422/307 |
| 7,211,442 | B2 * | 5/2007 | Gilbert et al. | 436/177 |
| 2004/0091398 | A1 * | 5/2004 | Gilbert et al. | 422/100 |
| 2004/0221902 | A1 * | 11/2004 | Aubry et al. | 137/826 |
| 2005/0161326 | A1 * | 7/2005 | Morita et al. | 204/450 |
| 2007/0183935 | A1 * | 8/2007 | Clemmens et al. | 422/100 |

OTHER PUBLICATIONS

Gladden, L. et al., "MRI visualization of two-phase flow in structured supports and trickle-bed reactors," *Catalysis Today*, vol. 79-80, pp. 203-210 (2003).
Heibel, A. et al., "Flooding performance of square channel monolith structures," *Ind. Eng. Chem. Res.*, vol. 41, pp. 6759-6771 (2002).
Krishna, R. et al., "Improving gas-liquid contacting in bubble columns by vibration excitement," *Intl. J. Multiphase Flow*, vol. 28, pp. 1223-1234 (2002).
Liu, W. et al., "Ministructured catalyst bed for gas-liquid-solid multiphase catalytic reaction," *A. I. Ch. E. Journal*, vol. 48, pp. 1519-1532 (2002).
Ma, J., *Forced Bubble Columns*, Master's Degree Thesis, submitted to the graduate faculty of Louisiana State University in Aug. 2003.
Ni, X. et al., "Mixing through oscillations and pulsations—A guide to achieving process enhancements in the chenical and process industries," *Trans. I. Chem. E.*, vol. 81, part A, pp. 373-383 (2003).

* cited by examiner

*Primary Examiner*—N. Bhat
(74) *Attorney, Agent, or Firm*—John H. Runnels; Bonnie J. Davis

(57) ABSTRACT

A microchannel reactor is disclosed that provides superior performance for three-phase (gas/liquid/solid-catalyst) reactions. The reactor may be used, for example, in industrial-scale catalysis, e.g., in large-scale chemical production, and also in catalyst screening. Each microchannel in the reactor has a separate micro-outlet to supply gas to the channel. Each microchannel is open on both ends, so that liquid may freely flow through the channels in both directions. Oscillatory forcing is applied to the liquid outside the microreactor. The combined effect of the separate gas inlets for each microchannel, the open nature of the microchannels on both ends, and oscillatory forcing results in highly efficient transport of both gas and liquid through all of the microchannels, promotes efficient mixing, and enhances catalysis.

18 Claims, 15 Drawing Sheets catalyst attached to walls of monolith

⌀1.59 mm

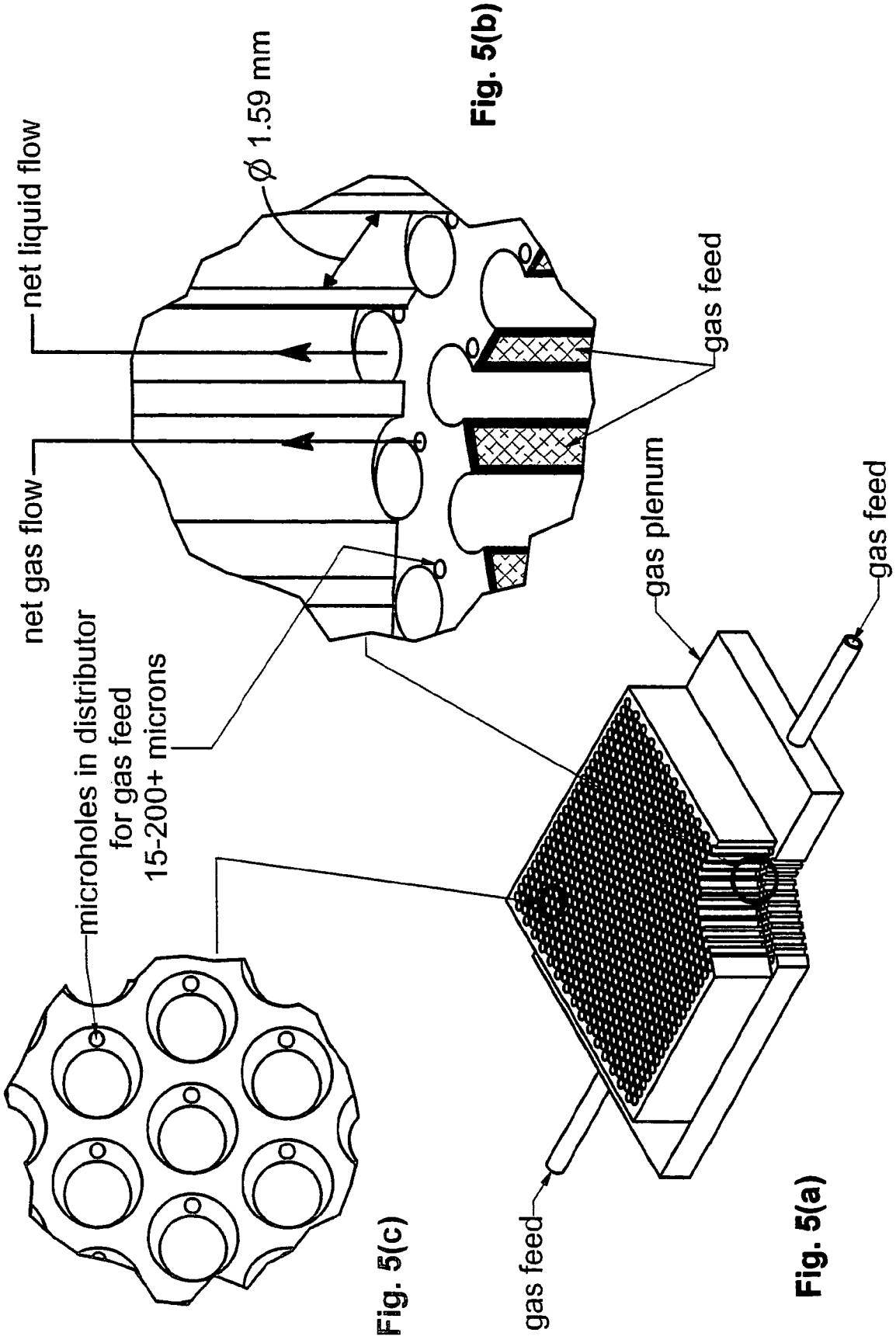

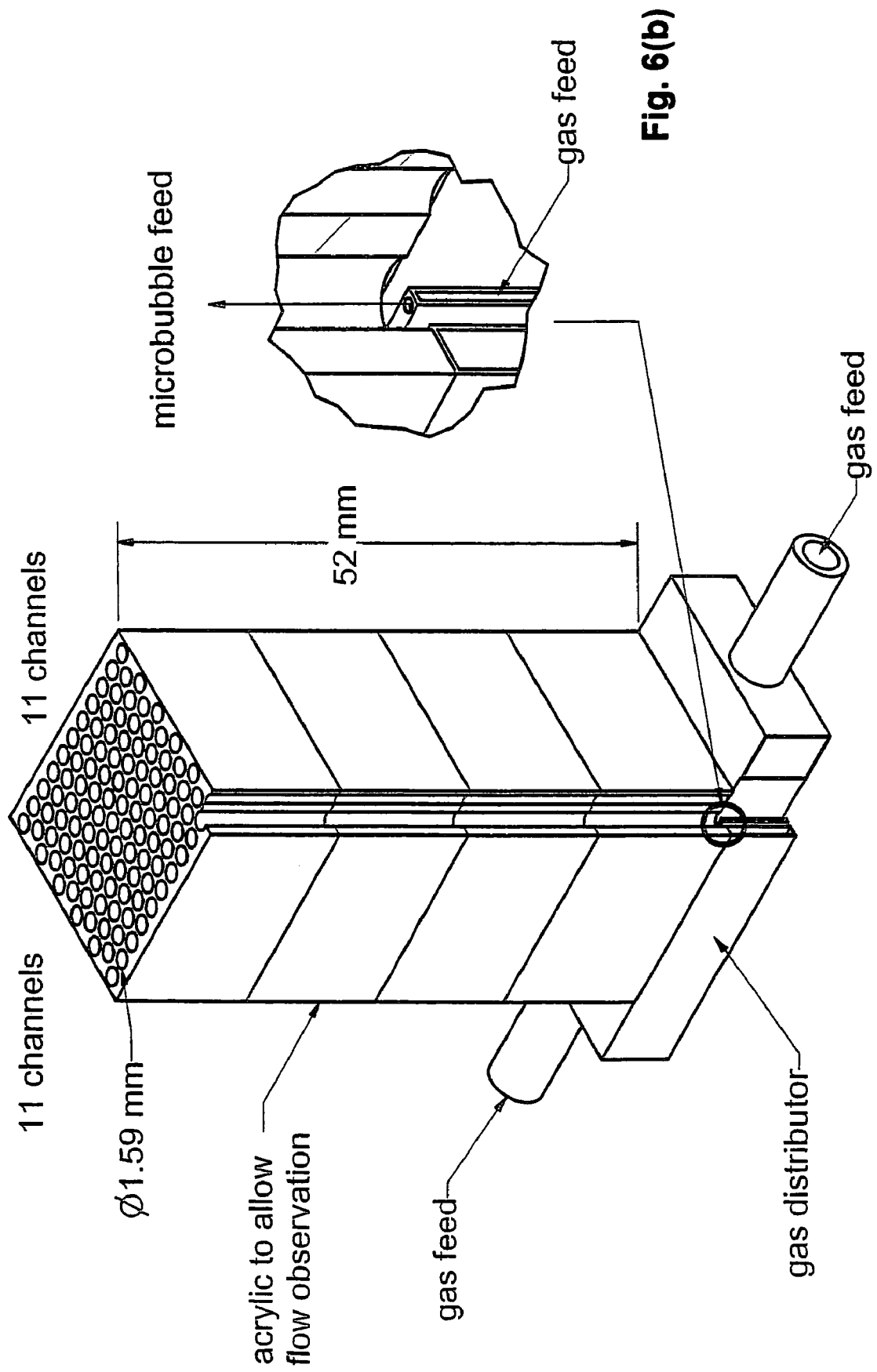

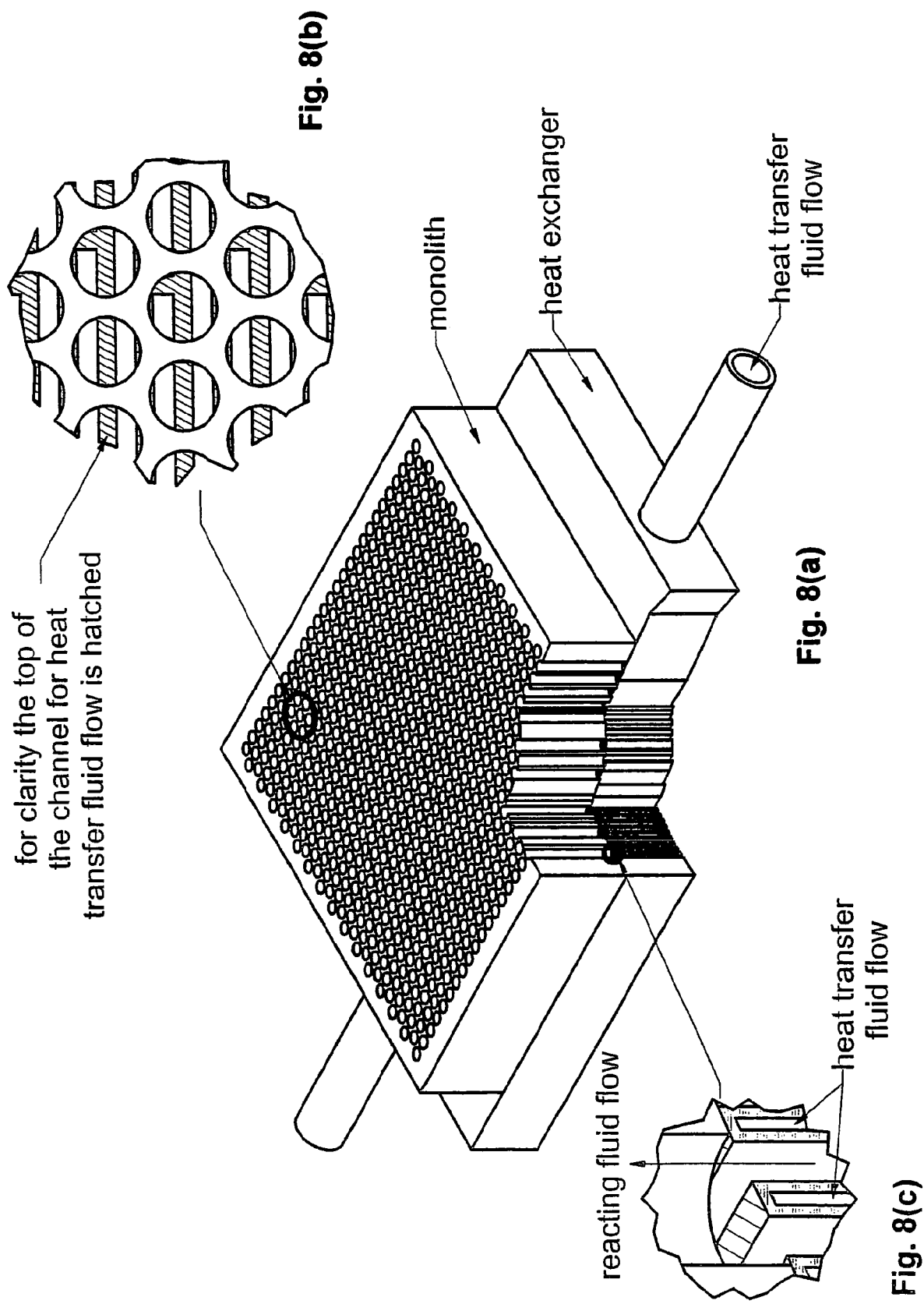

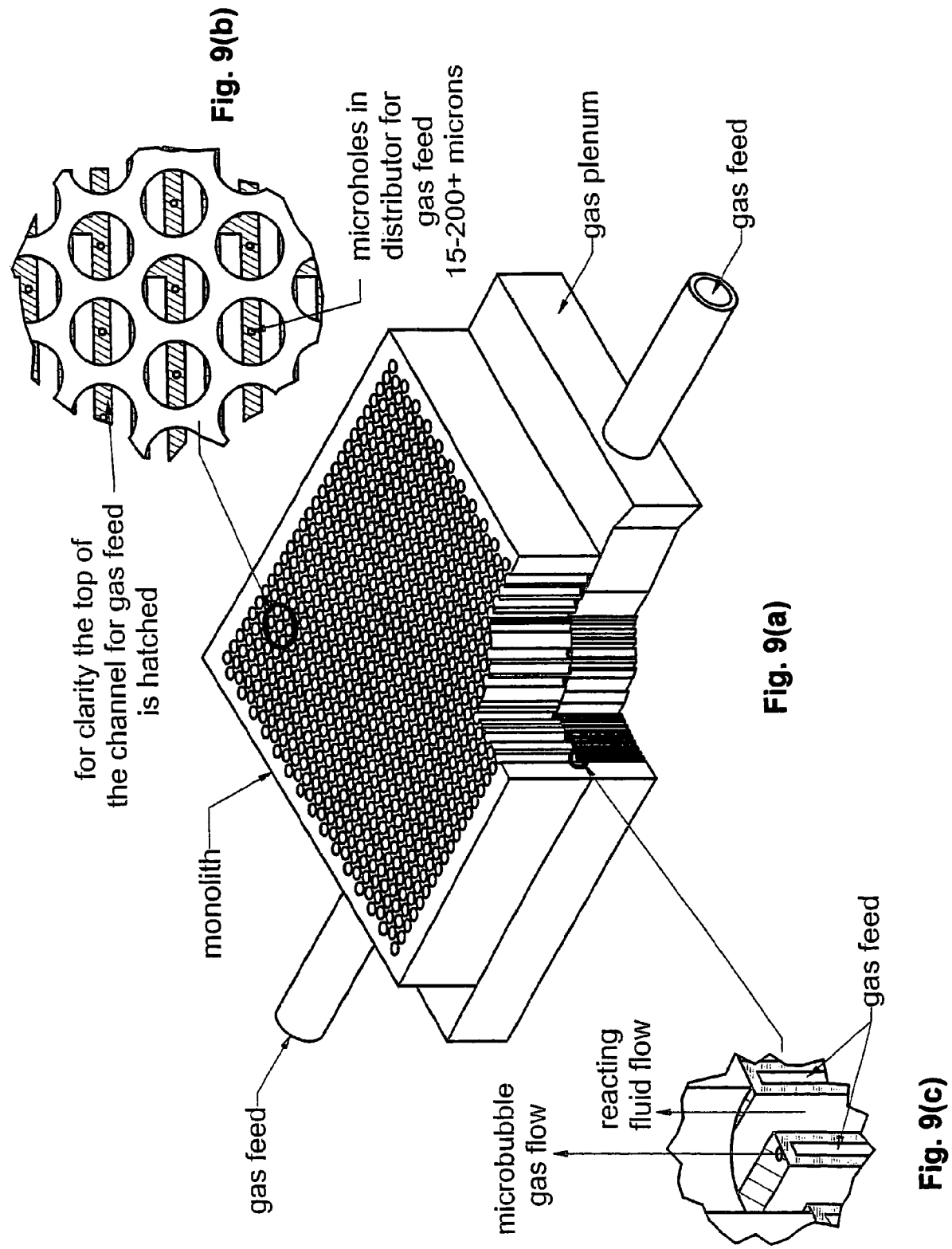

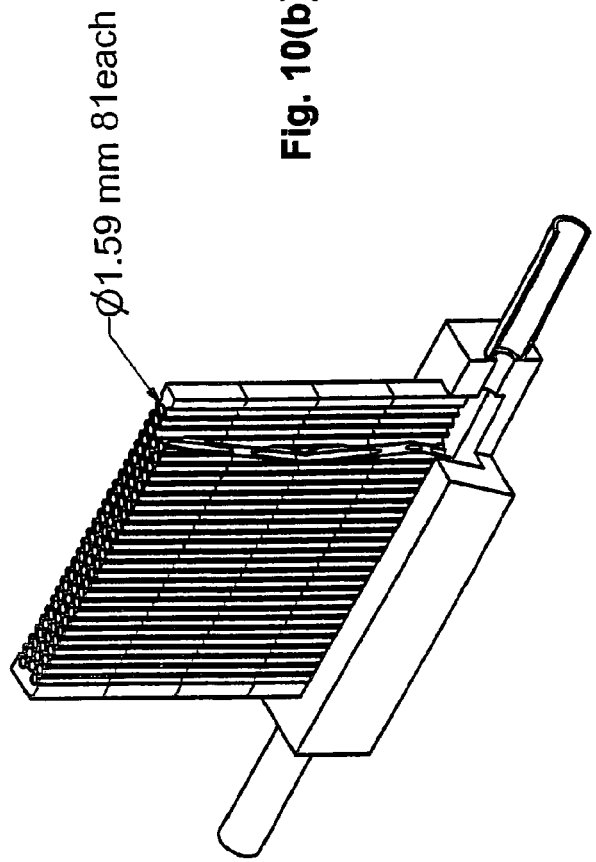
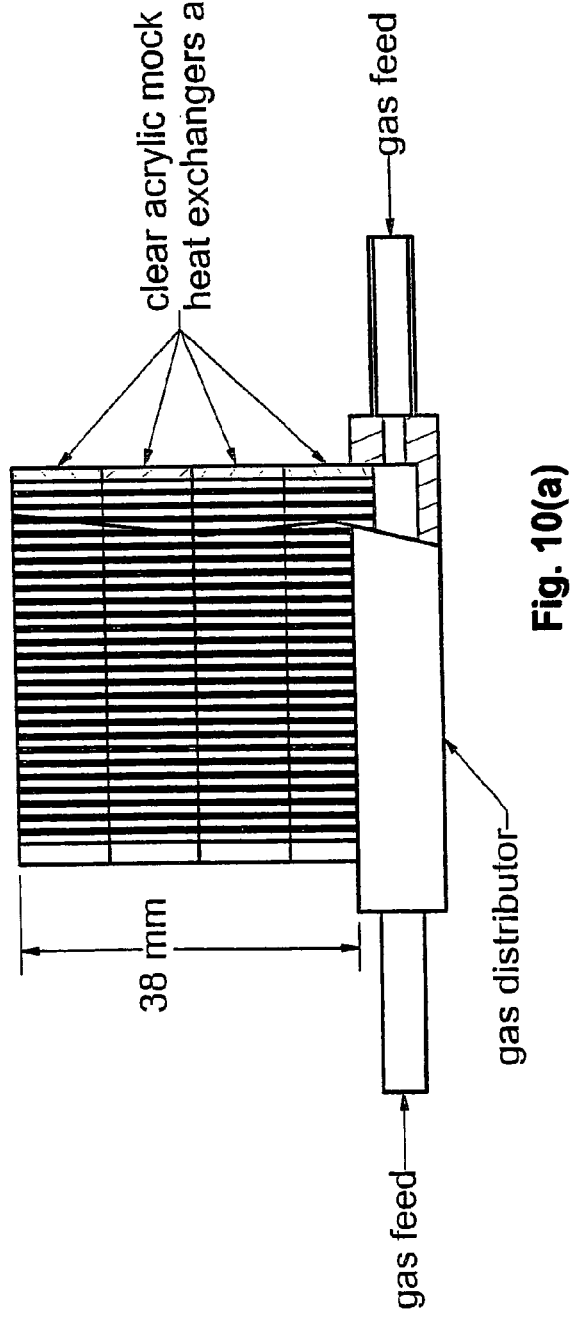
Fig. 10(b)
⌀1.59 mm 81each
clear acrylic mock up of heat exchangers and monoliths
gas feed
38 mm
gas distributor
gas feed
Fig. 10(a)

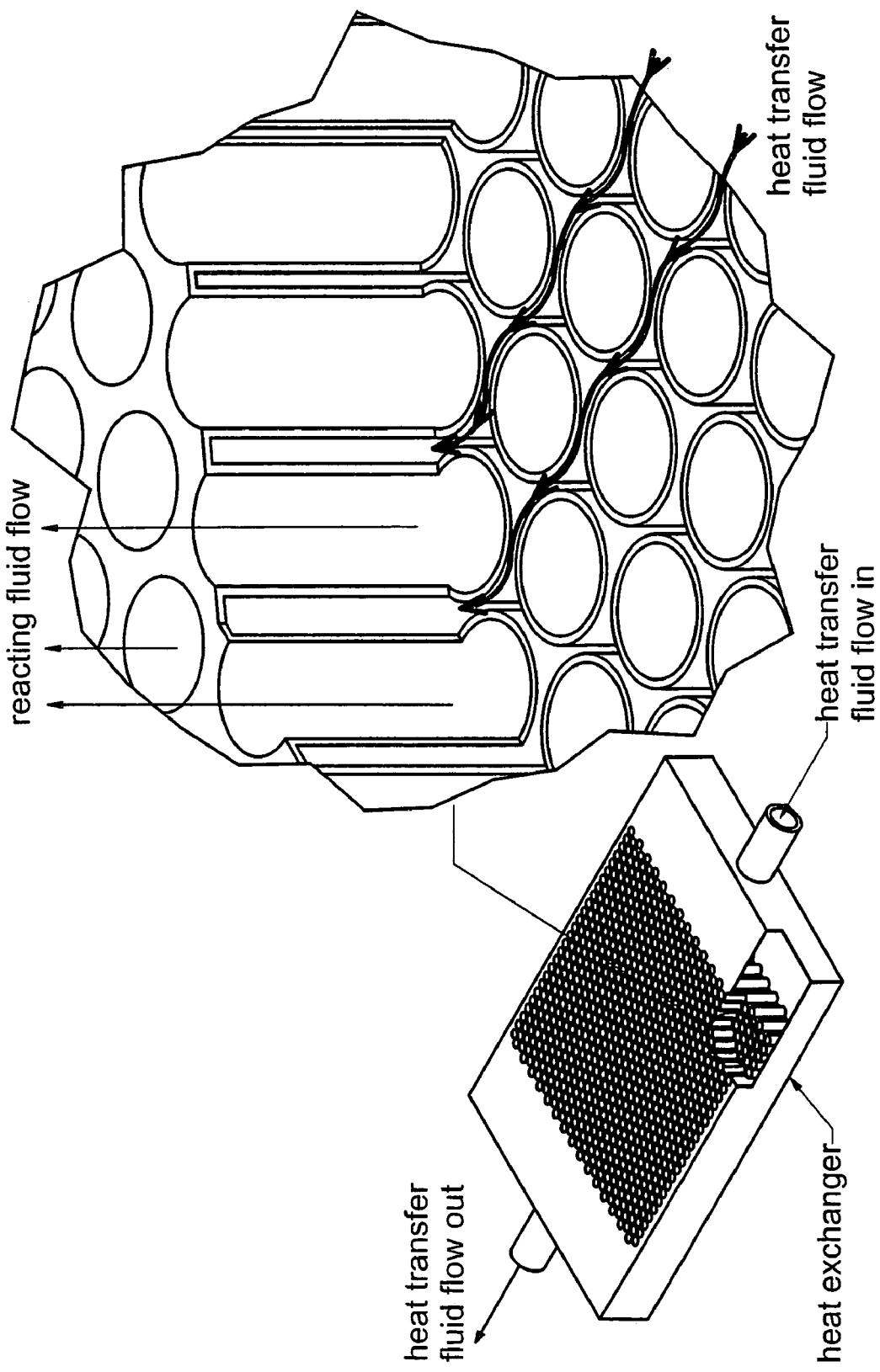

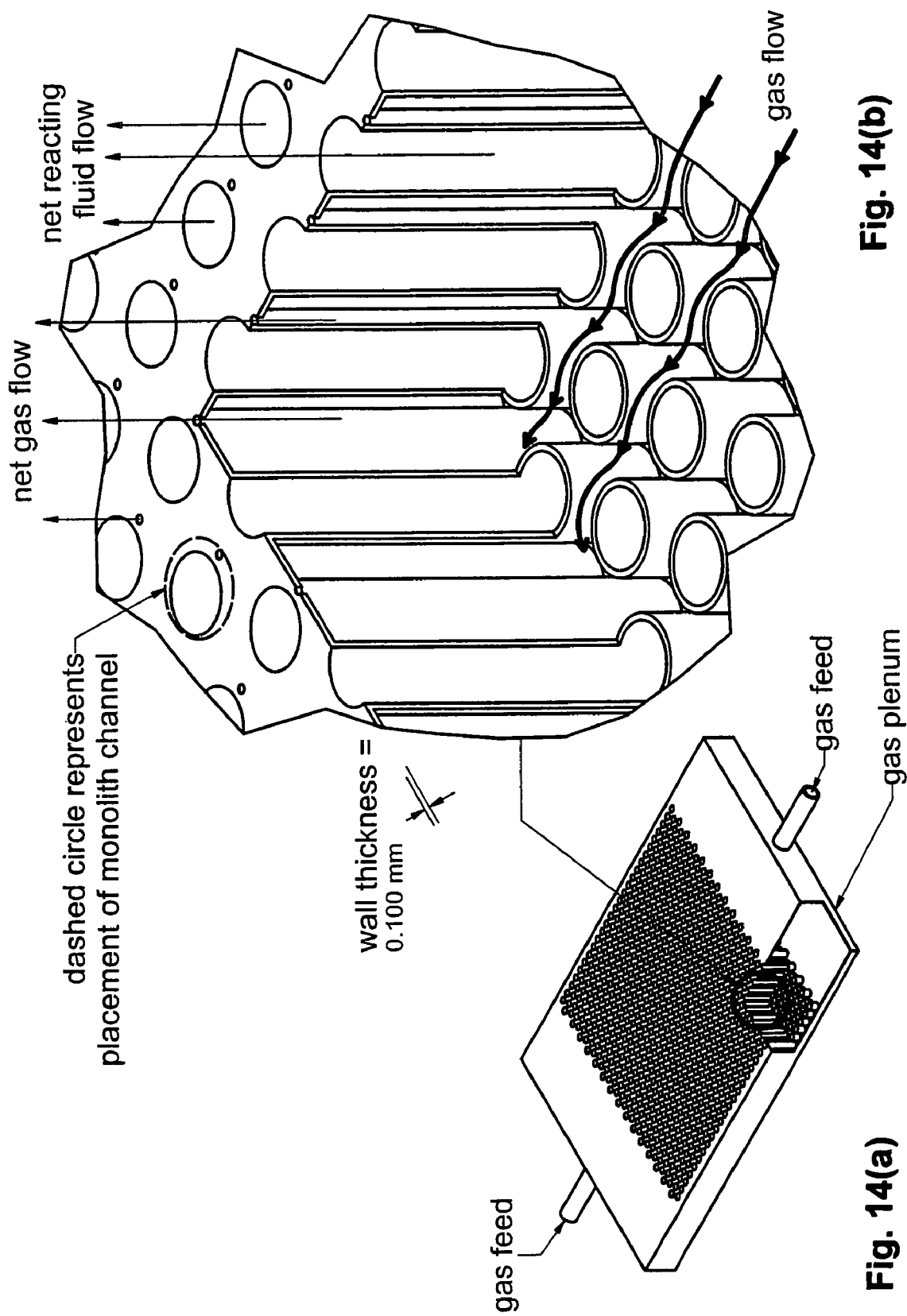

MICROCHANNEL REACTOR WITH ACTIVE OSCILLATORY FORCING

This invention pertains to microchannel reactors, particularly microchannel reactors whose performance is enhanced by the use of oscillatory forcing.

So-called monolith reactors have been used to promote catalysis in liquid-gas reactions. A monolith is a single piece, typically formed of ceramic, with microchannels running through it. Larger reactors may be made by stacking multiple monoliths, generally with their respective microchannels aligned. Catalysts may be embedded on, or adsorbed onto, the surfaces of the microchannels, to provide active sites for catalysis reactions. A liquid phase and a gas phase are brought into contact in the microchannels, where they react in the presence of the solid-phase catalyst. Reaction rates are enhanced by thorough mixing of the gas and liquid phases. However, it has previously been thought to be difficult to promote efficient mixing within a microchannel, due to factors such as surface tension and poor distribution of gas and liquid phases within the narrow diameter of the channel. (Note: Unless context indicates otherwise, the words "channel" and "microchannel" are used interchangeably throughout this specification.)

Both countercurrent and co-current flow of the gas and liquid phases have been used in monolith reactors. However, co-current operation tends to suffer from poor gas and liquid distribution within the channels, while flooding can be a problem in countercurrent operation. (Flooding occurs when liquid begins to flow in the same direction as the gas, opposite to the desired direction of flow.)

Active forcing, i.e., modulating or pulsing fuel streams or air streams to a combustor, has been used to improve bulk spray combustion efficiency. Active forcing has also been used to promote bubble breakup in bulk columns.

R. Krishna et al., "Improving gas-liquid contacting in bubble columns by vibration excitement," *Intl. J. Multiphase Flow*, vol. 28, pp. 1223-1234 (2002) discloses the use of vibrations in a bulk-scale reactor column (e.g., inner diameter 10 cm, height 2 m) to help break up bubbles, to improve the gas-liquid mass transfer coefficient without intense agitation of the liquid, while maintaining the plug flow character of the bubbles, and without large-scale back mixing of the liquid phase.

A. Heibel et al., "Flooding performance of square channel monolith structures," *Ind. Eng. Chem. Res.*, vol. 41, pp. 6759-6771 (2002) discusses the flooding performance of square channel monoliths under a variety of conditions. Flooding, a common problem in microchannels, was found to be dependent on drainage of liquid at the outlet. Metal plates with drop points were used to reduce blockage of gas passages at the exits of the monolith. The authors reported that operation was not feasible at higher liquid flow rates without this outlet device.

L. Gladden et al., "MRI visualization of two-phase flow in structured supports and trickle-bed reactors," *Catalysis Today*, vol. 79-80, pp. 203-210 (2003) discloses the use of magnetic resonance imaging (MRI) to visualize and analyze two-phase flow in a ceramic monolith. FIG. 2 of this paper depicts three versions of an MRI image of the flow of gas and liquid through the microchannels of a monolith reactor. Two points concerning this image bear note: (1) Discontinuous "slugs" of gas and liquid appear in the channels, indicating that the mixing between phases is not as complete as might be wished. (2) Gas bubbles appear to be traveling only through a subset of the microchannels, while there appears to be an absence of gas flow through many of the channels. These two observations, although not the emphasis of the Gladden et al. paper, and although by no means proven in general by virtue of a single example, nevertheless provide a convenient illustration of phenomena that we have consistently observed in our laboratory. Before we made the present invention, we had observed that gas flow through any particular monolith appeared to be limited to a small subset of the microchannels, unless the gas flow rate were increased to a point at which the flow of any liquid into the channels had essentially ceased. With virtually no liquid flowing into the channels, catalysis at the microchannel walls is greatly curtailed.

X. Ni et al., "Mixing through oscillations and pulsations—A guide to achieving process enhancements in the chemical and process industries," *Trans. I. Chem. E.*, vol. 81, part A, pp. 373-383 (2003) provides a review of the use of oscillations and pulsations to enhance mixing in bulk industrial chemical processes, particularly in baffled columns.

W. Liu et al., "Ministructured catalyst bed for gas-liquid-solid multiphase catalytic reaction," *A. I. Ch. E. Journal*, vol 48, pp. 1519-1532 (2002) provides a review of "ministructured catalyst beds," or microchannel reactors. Ministructured reactors were reported to improve the performance of multiphase gas-liquid-solid reactions over conventional packed-bed and trickle-bed reactors. In the ministructured reactor, the catalyst bed is structured at the particle level by dividing the bed into a number of identical, parallel flow channels with the channel walls being catalyzed. The hydraulic diameter of each channel opening is from 0.2 to 2 mm, comparable to the conventional particle size. The mini-structured reactor can be assembled using monolith catalyst modules that have been a proven material technology for gas-phase reactions. Better contact of gas, liquid and catalyst, and enhancement of overall mass-transfer, improved the gas/liquid multiphase reaction performance. This paper alludes (at pages 1524 and 1526) to potential problems with maldistribution that can easily occur with multiple channel openings.

We have discovered a microchannel reactor that provides superior performance for three-phase (gas, liquid, solid-catalyst) reactions. The novel reactor may be used, for example, in industrial-scale catalysis, e.g., in large-scale chemical production, and also in catalyst screening. Each microchannel in the reactor has a separate micro-outlet to supply gas to the channel. Each microchannel is open on both ends, so that liquid may freely flow through the channels in both directions. Oscillatory forcing is applied to the liquid outside the microreactor. The combined effect of the separate gas inlets for each microchannel, the open nature of the microchannels on both ends, and oscillatory forcing results in highly efficient transport of both gas and liquid through all of the microchannels, promotes efficient mixing, and enhances catalysis.

The novel microreactor is ideally suited for three-phase (gas/liquid/solid catalyst) reactions, particularly gas phase-limited reactions. A gas plenum with microholes introduces gas into the corresponding microchannels. Oscillatory forcing produces uniform gas flow rates in the various channels of the microreactor. The novel microreactor requires less energy and allows more precise temperature control than has been possible with prior monolith-based reactors. The combination of precise temperature control and active forcing increases reaction rates for gas phase-limited reactions, and allows for wider variations of gas/liquid loadings in monolith systems.

BRIEF DESCRIPTION OF THE DRAWINGS

FIGS. 5(a), 5(b), and 5(c) depict a cross-section view, an expanded cross-section view, and a top view, respectively, of a gas distributor and its adjacent monolith.

FIGS. 6(a) and 6(b) depict a plan view and an expanded cross-section view, respectively, of a modified monolith-microchannel heat exchanger assembly in which the heat exchangers and monoliths were replaced with acrylic surrogates.

FIGS. 8(a), 8(b), and 8(c) show a plan view, a top view, and an expanded cross-section view, respectively, of a high heat transfer microreactor (HHTM) employing slotted microchannel heat exchangers.

FIGS. 9(a), 9(b), and 9(c) depict a plan view, a top view, and an expanded cross-section view, respectively, of an alternative embodiment in which gas feed holes are drilled into rectangular heat exchanger channels.

FIGS. 10(a) and 10(b) depict alternative views of an earlier device with a closed plenum.

FIGS. 13(a) and 13(b) depict a plan view and an expanded cross-section view, respectively, of heat exchangers that may be used in the present invention.

FIGS. 14(a) and 14(b) depict a plan view and expanded cross-section view, respectively, of the gas distributor layer with microholes.

EXAMPLE 1

Figure 1:
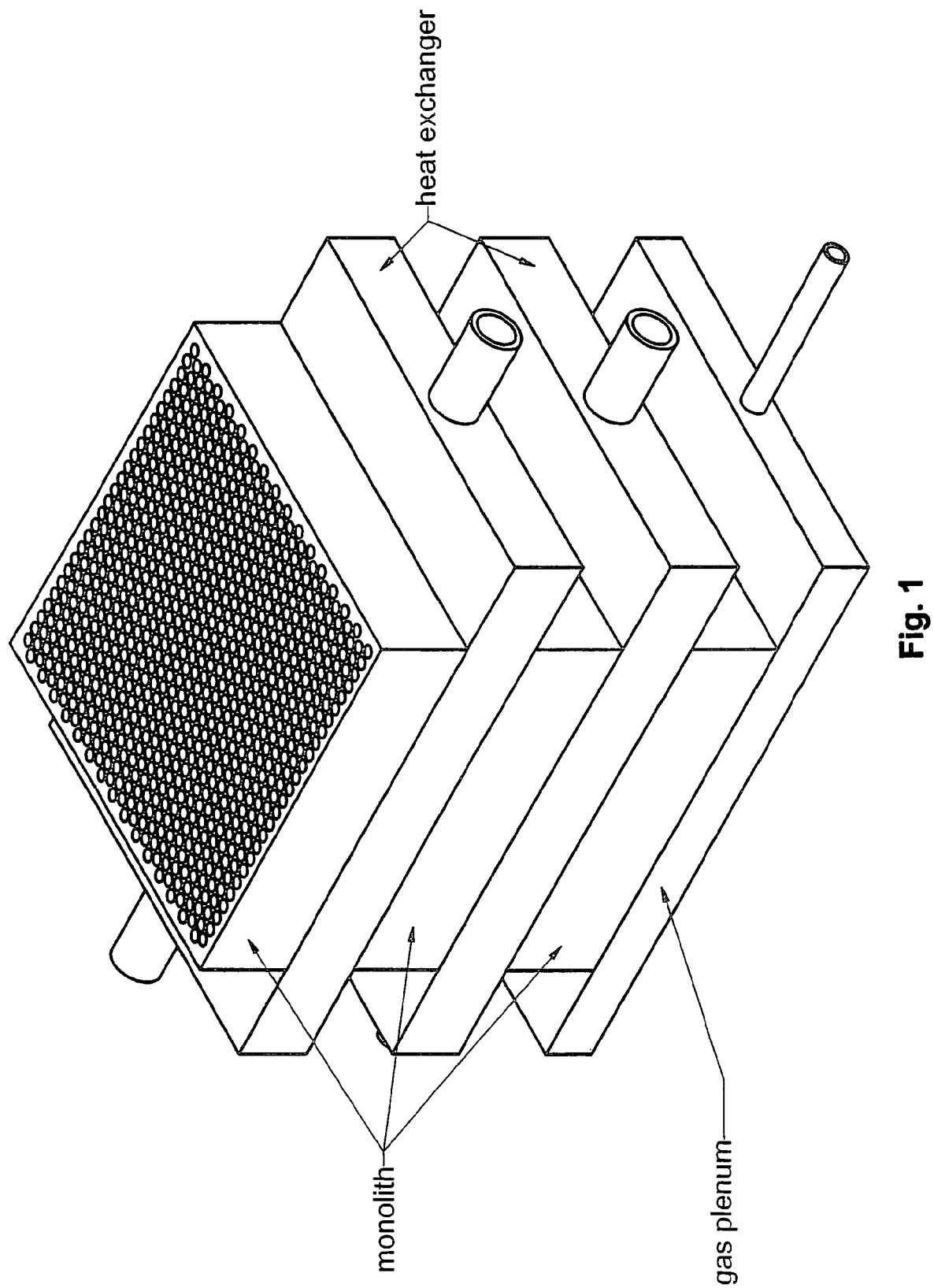
FIG. 1 depicts one embodiment of a microchannel reactor in accordance with the present invention.

FIG. 1 depicts one embodiment of a microchannel reactor in accordance with the present invention. The reactor comprises alternating layers of monoliths and (optional) cross-flow heat exchangers, with a gas plenum (gas distributor) as the bottom layer. Different numbers and combinations of monoliths, heat exchangers, and gas distributors may be used in lieu of the particular embodiment depicted in FIG. 1.

The design and operation of the device are described in greater detail below. A broad overview will be provided at this point. The monolith layers are traversed by numerous microchannels that run through the reactor. The walls of the microchannels will, in general, include a solid catalyst to promote a particular reaction. The optional but preferred heat exchangers have separate channels running in the plane of the heat exchangers, to transport a fluid that transfers heat to or from the reaction mixture. Perpendicular to the plane of the heat exchanger, the microchannels run through the heat exchangers and the monoliths. Reactants and products may flow through the microchannels. Heat is exchanged between the reaction mixture and the heat transfer fluid through the thin walls of the heat exchanger. The gas plenum layer is generally similar to the heat exchanger layers except, as discussed further below, the plenum also has micro-outlets or microholes to admit gas into the reaction channels. Otherwise, the plenum has reactant channels passing through it just as do the other layers. The reactant channels through the different layers, i.e., the channels of the monoliths, the channels of the heat exchangers, and the channels of the plenum, run completely through all the layers, so that gas and liquid are both free to flow through the entire lengths of these channels, including free flow in and out of both ends of the channels. Not shown in FIG. 1 (but depicted, for example, in FIG. 7), is a source of mechanical oscillation, such as a rigid or flexible piston.

In operation, liquid is supplied to the device. Preferably, the device is immersed in the liquid, although it is not necessary that the liquid provide any substantial head of pressure above the device. Indeed, one of the advantages of the invention is that thorough mixing and flow of both gas and liquid are obtained without the need for a head of liquid. Gas is supplied to each of the microchannels from the microholes or micro-outlets in the plenum. Oscillatory forcing is applied to the liquid from the piston (or other oscillation source) outside the device. The combination of gas supply to each microchannel, each microchannel's being open on both ends, and the oscillatory forcing causes gas to efficiently flow through all the channels during the upstroke, and liquid to surge back through all the channels on the downstroke. A thin layer of liquid remains on the walls of the channels during the upstroke, and mixing between gas and liquid is highly efficient.

Figure 2:
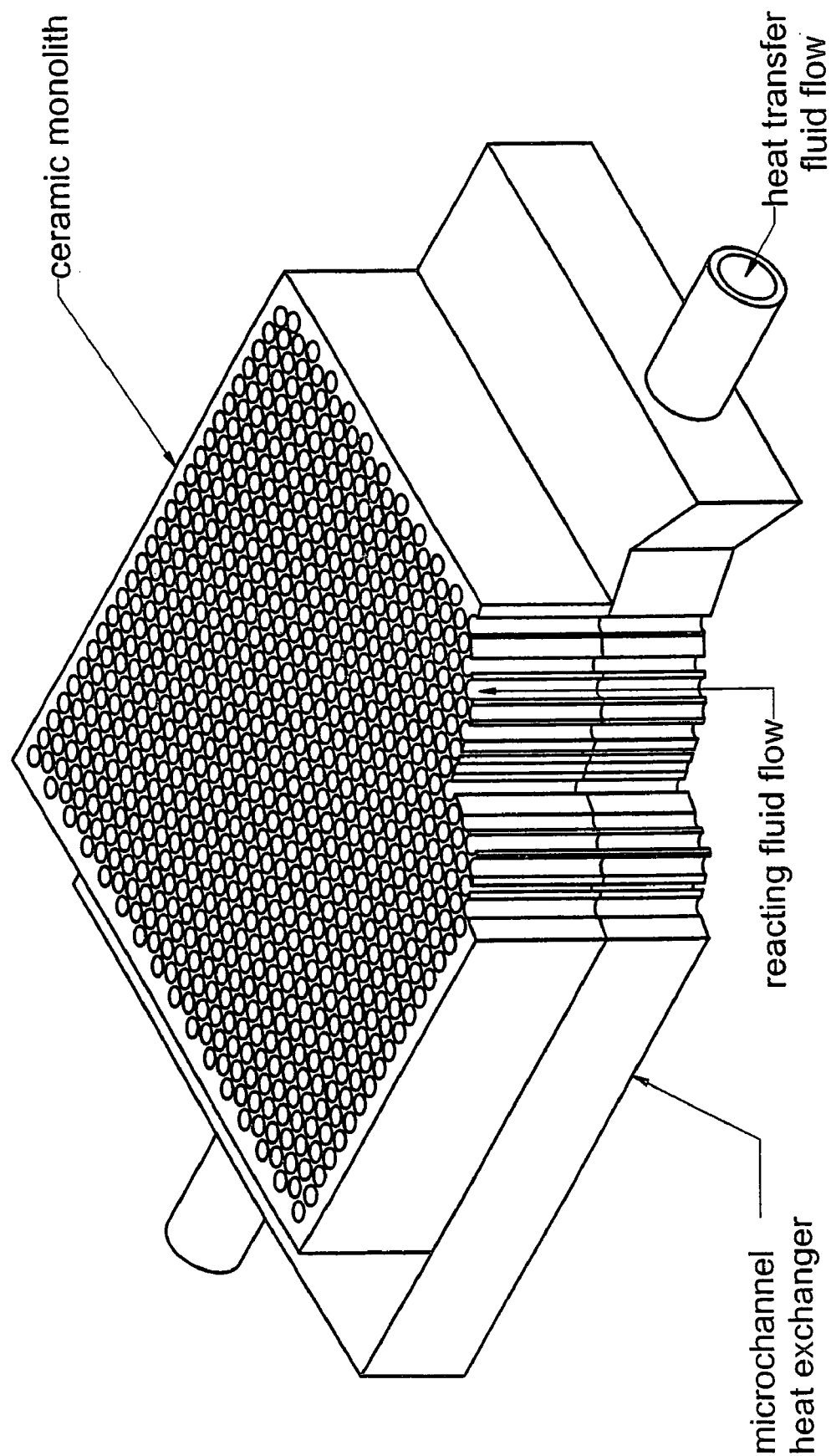
FIG. 2 depicts a cutaway view of a single microchannel heat exchanger and adjacent monolith.

FIG. 2 depicts a cutaway view of a single microchannel heat exchanger layer and an adjacent monolith. Note the alignment of the fluid channels through both.

Figure 3B:
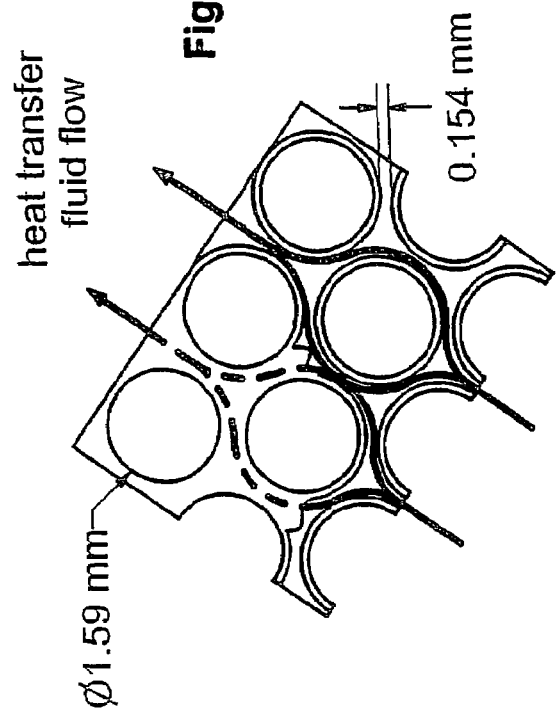
FIGS. 3(a) and 3(b) depict an expanded cutaway view and top view, respectively, of a single microchannel heat exchanger and adjacent monolith.
Figure 3A:
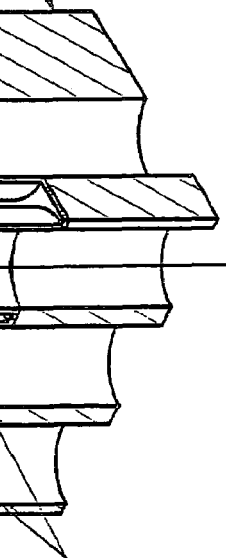

FIGS. 3(a) and 3(b) depict an expanded cutaway view and top view, respectively, of a single microchannel heat exchanger layer and adjacent monolith. A heating or cooling fluid, such as ethylene glycol, flows in separate channels in the heat exchanger, more-or-less perpendicular to the reacting stream. The heating or cooling fluid is separated by thin walls from the reacting stream, physically separated but readily able to transfer heat. This design allows even a relatively small heat exchanger to remove or add kilowatts of heat, either heating or cooling as needed for a particular reaction. Precise temperature control may be achieved (e.g., ±0.1° C.).

Figures 4A, 4B:
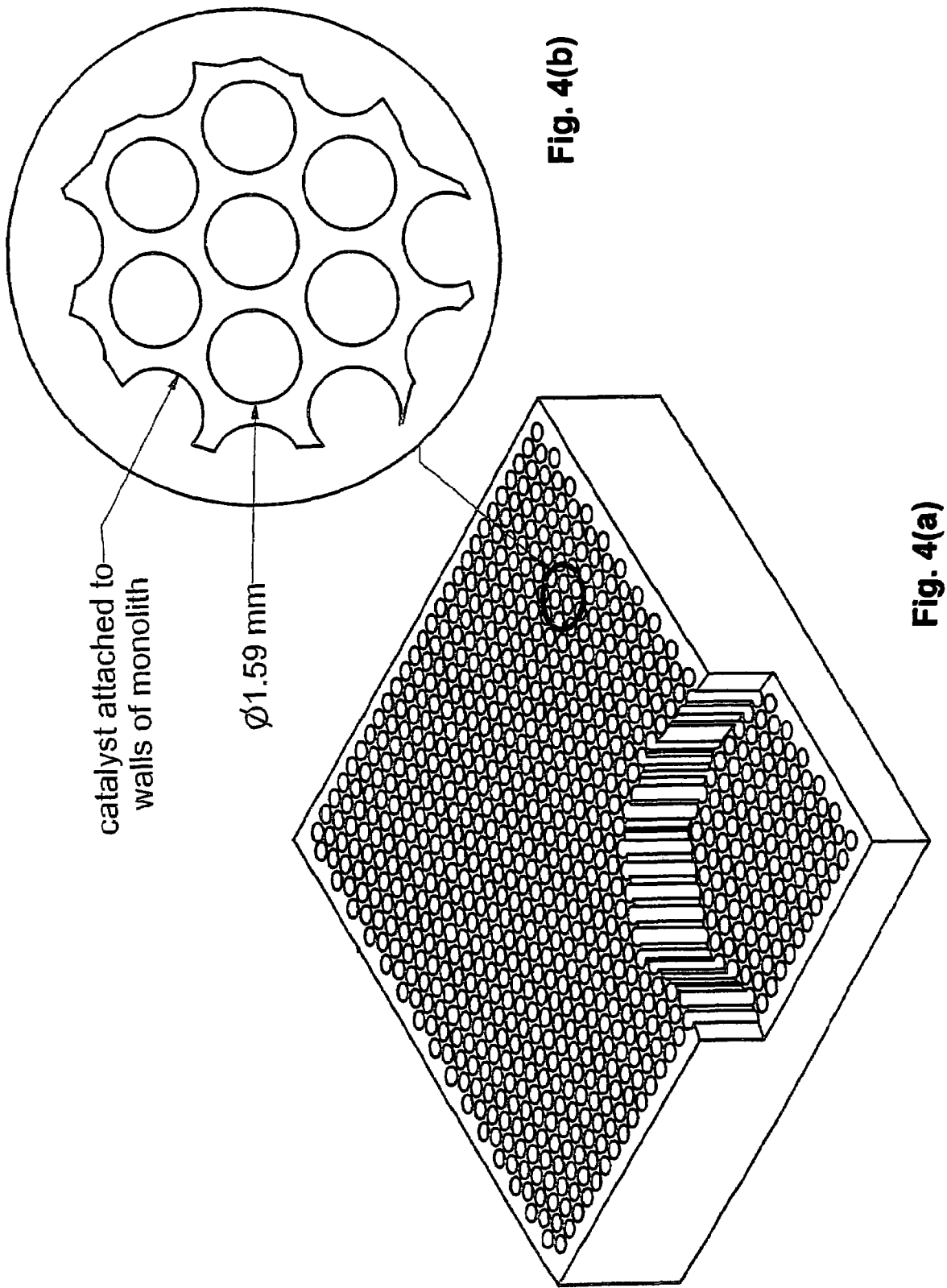
FIGS. 4(a) and 4(b) depict an expanded cross-section view and top view, respectively, of a monolith.

FIGS. 4(a) and 4(b) depict an expanded cross-section view and top view, respectively, of a monolith. The monolith may be formed from materials otherwise known in the art for such purposes, for example cordierite ($2MgO \cdot 2Al_2O_3 \cdot 5SiO_2$), alumina, alumina-silica, iron oxide, or carbon. The catalyst may be introduced through means known in the art, for example, wash-coating onto the walls of the microchannels. The characteristic channel diameter in a prototype monolith that we constructed was 1.59 mm. Typical channel diameters range from about 0.1 to about 20 mm, preferably about 0.5 to about 5 mm. Each channel in the monolith is aligned with an identically (or similarly) sized channel in the microchannel heat exchanger. Repeating this configuration produces a "stacked microreactor" of alternating monoliths and heat exchangers. This design provides a low pressure drop, and very high mass transfer rates as compared to trickle bed reactors or slurry bubble column reactors.

The microchannel heat exchangers may be made, for example, by the techniques described in U.S. Pat. No. 6,415,860 and in published U.S. patent application 20020125001-A1. Such microchannel heat exchangers may also be purchased from International Mezzo Technologies, Baton Rouge, Louisiana. FIGS. 13(a) and 13(b) depict a plan view and an expanded cross-section view, respectively, of such heat exchangers, showing the generally perpendicular directions of flow of the reacting fluid and of the heat transfer fluid.

An ideal flow pattern in a monolith-based reactor is one in which the walls of the monolith are coated with as thin a liquid layer as possible, and gas in the channels readily diffuses through the liquid layer to reach catalyst on the walls. There should be frequent, continuous or almost continuous renewal of both liquid and gas.

FIGS. 5(a), 5(b), and 5(c) depict a cross-section view, an expanded cross section view, and a top view, respectively, of one embodiment of a gas distributor and adjacent monolith for use in the present invention. The gas distributor layer is generally similar to the microchannel heat exchanger layers, with the addition of microholes as depicted in FIGS. 5(b) and 5(c) to feed gas into the reaction channels. Note in particular in FIG. 5 that the channels are open on both ends of the gas distributor layer. In a prototype embodiment as shown in FIG. 5, the channel hole diameter in the plenum was slightly smaller than the channel diameter (1.59 mm) of the monolith. This difference in diameters left sufficient room to drill a microhole adjacent to each channel of the distributor, but still feeding to the interior of the adjacent monolith channel, as depicted in FIGS. 5(b) and 5(c). The diameter of the microholes is preferably from about 75 microns to about half the diameter of the channel. The microholes allow gas to be introduced into every channel of the monolith, with only a small pressure drop across the reactor. In prototype embodiments we have drilled 200 micron-diameter and smaller holes at appropriate locations in the microchannel distributor. See also FIGS. 14(a) and 14(b), depicting a plan view and expanded cross-section view, respectively, of the gas distributor layer with microholes, and in one instance illustrating their alignment with the channel of the neighboring monolith.

An alternative to making the channel hole diameter smaller in the plenum is to keep all channels uniform (1.59 mm) and simply set the hole alignment in the plenum slightly off center compared to those in the heat exchangers and monoliths. The slightly off-center positioning allows the addition of the microholes for gas feed.

The microchannel reactors may be used in either a counter-current or a co-current mode (although such terms may be less meaningful in the context of this invention than in other settings). Referring to FIG. 5, when the reactor is used in co-current mode liquid is fed at the reactor base, and gas is introduced at the bottom of each channel by the distributor. Alternatively, the co-current feed of gas and liquid could be introduced at the top or side of the reactor. In countercurrent flow, liquid may be fed at the top of the reactor, and gas introduced at the bottom of each channel by the distributor. More generally, gas and liquid may be introduced at various locations in the assembly consistent with the direction of flow and suitability for oscillatory forcing. For example, in a suitable situation, the reactor may simply be immersed into a pool or body of liquid, without requiring a separate, purpose-made vessel to hold the liquid. We found experimentally that, regardless of the feed direction, a reactor as otherwise depicted in FIG. 5 did not function efficiently without oscillatory forcing. Our experiments found that even when gas was fed to every channel through microholes as depicted in FIG. 5, the gas preferentially flowed through only a small subset of those channels, while there was little or no gas flow through the remaining channels. Without wishing to be bound by this theory, it is believed that small differences in pressure drop and surface tension in the different channels were responsible for the preferential gas flow patterns.

EXAMPLE 2

FIGS. 6(a) and 6(b) depict a plan view and an expanded cross-section view, respectively, of a modified monolith-microchannel heat exchanger assembly in which the heat exchangers, monoliths, and the walls enclosing the reactor were replaced with PMMA (poly (methyl methacrylate)) to allow visual observation of flow within the channels. The gas distributor was metal.

EXAMPLE 3

Figure 7:
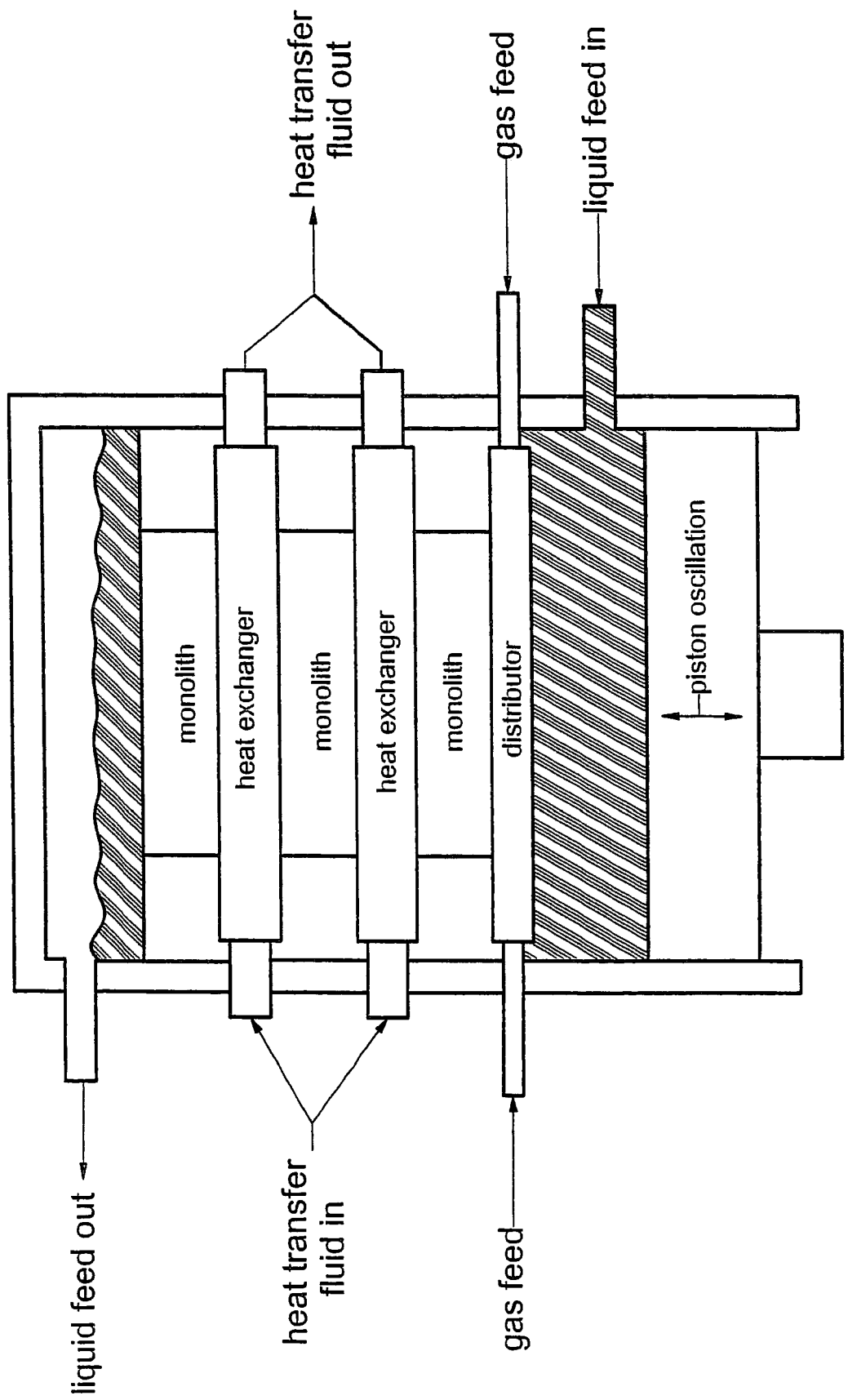
FIG. 7 depicts a microreactor with a piston-type driver to provide oscillatory forcing.

We found that active oscillatory forcing greatly facilitated uniform, controllable flow through all microreactor channels. As depicted in FIG. 7, the microreactor has a source of oscillatory energy such as a rigid or flexible piston-type driver. Oscillation amplitude is typically between about 0.1 and about 100 mm, although larger and smaller amplitudes may readily be used as well. Oscillation frequency is typically between about 0.1 and about 100 Hz, although slower and faster oscillations may also be used, with a preferred range between about 1 and about 30 Hz. We observed that the gas and liquid flow in each microchannel became uniform and controllable over a range of frequencies and amplitudes. The frequency and amplitude depend on factors such as channel diameter, liquid viscosity, and gas feed hole diameter. Suitable frequencies and amplitudes may readily be determined for any given system by altering the amplitude and frequency and determining which conditions produce uniform flow.

Without wishing to be bound by this theory, it is believed that the mechanism underlying the surprisingly uniform flow lies along the following lines. On the down stroke of the piston, the liquid phase is pulled through the microchannels. This downward flow suppresses gas flow from the gas feeder holes near the bottom of each channel. The channel thus becomes liquid-rich. The up-stroke of the piston then causes liquid to flow up and out of the microchannels. The capillary channels then become predominately gas-filled. In much the same way that a water aspirator may be used to pull a vacuum (the Bernoulli effect), the up-flow creates a gas-rich channel.

The piston may be rigid or flexible. If solid pistons are used, they are preferably used in conjunction with O-rings, or piston rings, as otherwise known in the art (for example, similar to those used in internal combustion engines).

To create one embodiment of a flexible piston, the base of a larger column that contained the reactor was sealed with a flexible membrane. A center portion of the membrane was then mechanically coupled to an eccentric cam, allowing the remaining portion of the membrane to sustain its own dynamics during oscillation. We observed that solid and flexible piston systems produced different transport results under otherwise identical conditions. In general, a solid piston is preferred when working at reactor pressures above atmospheric.

The system is reproducible. It is self-triggered at appropriate forcing frequencies—meaning that the release of gas automatically occurs during the upstroke, and is inhibited or ceases on the downstroke, without the need for external control other than the oscillatory forcing itself. The down stroke creates a capillary channel rich in liquid. The up stoke forces liquid out of the channel and creates capillaries rich in gas, with the walls coated with liquid. The up stroke provides a highly favorable environment for gas phase-limited reactions. By varying the gas flow rate, the amplitude, and the frequency of oscillation, the velocity in the channels and hence the thickness of the liquid remaining on the wall during the up stroke can be controlled. The velocity in the channels creates excellent mixing of gas and liquid in the channels, producing results such as those discussed in connection with FIG. 12 below.

The novel microchannel reactor can be used for many types of processes, including rapid catalyst screening and chemical production. The microreactor may be extended to large scale production by increasing the number of channels. Alternatively, parallel microreactors may be used, for example employing pistons driven by electric cams, somewhat similar to an internal combustion engine. Another alternative is that some reactions do not require a catalyst, or in some the catalyst may be introduced as part of the liquid feed or gas feed.

The novel system is particularly well-suited for use in gas-phase limited reactions, for example, oxygenation reactions, and hydrogenation reactions such as polymer hydrogenations or the Fischer-Tropsch process. For reactions that run best at above-atmospheric pressure, the apparatus may be enclosed in a pressurized vessel. For many polymer hydrogenations, for example, the preferred pressure is between about 15 bar and about 50 bar.

EXAMPLE 4

Observations with the acrylic-walled system depicted in FIG. 6 have demonstrated the superior results that may be obtained with the novel microreactor system. In one set of experiments, the oscillation amplitude was 2.46 mm, the frequency was 2 Hz, and the gas flow rate was 15 ml/s. In an unforced but otherwise identical system, the flow through the microchannels had been observed to be very uneven. By contrast, with oscillatory forcing, during the down stroke, no gas was observed exiting the channels. During the up stroke there was a uniform "explosion" of gas flow through each capillary. These forcing conditions sufficed to force most of the liquid from the channels on the up stroke, leaving a channel environment gas rich for reaction. There was excellent mixing during the gas expulsion phase of the cycle.

Even with small piston displacement amplitude at low frequencies, oscillatory forcing caused gas bubbles to surge through the reactor channels on the upstroke, and caused liquid to surge back through the channels on the downstroke. The difference between the forced and unforced systems was dramatic. Also dramatic was the difference between a forced system with a closed gas plenum, versus a forced system with open channels on top and bottom in accordance with the present invention. Good flow on both upstroke and downstroke was only obtained with oscillatory forcing of a reactor whose channels were open on both ends.

It is reasonable to expect that the high fluid velocity through the channels caused by oscillatory forcing will also have the incidental benefit of reducing plugging or fouling of the channels (although we do not have data on such a "cleaning" effect as of the filing date of this application).

EXAMPLE 5

The microreactor depicted in FIGS. 1 through 5 is well-suited for use as a low pressure-drop microreactor (LPDM). An alternative embodiment, a high heat transfer microreactor (HHTM), is depicted in FIGS. 8(a), 8(b), and 8(c), in plan view, top view, and expanded cross section view, respectively. The HHTM employs slotted microchannel heat exchangers (available from International Mezzo Technologies, Baton Rouge, La.). The microchannels may, for example, have a thin rectangular cross section as depicted in FIG. 8, to enhance both the area available for heat transfer area and the mechanical strength of the structure.

FIGS. 9(a), 9(b), and 9(c), depict a plan view, a top view, and an expanded cross-section view, respectively, of an alternative embodiment of the gas distributor in which gas feed holes are drilled into the rectangular channels of such a slotted heat exchanger.

The heat exchangers may be used to control reaction temperature by providing heating, cooling (as may needed in certain exothermic reactions), or both. The microreactor may be extended to any size and number of channels. The gas and liquid feeds can be either countercurrent or co-current, with feed from the top, bottom, or sides of the reactor. In some applications it may be desirable to use multiple plenums for multiple gas feeds, or even for liquid feeds with sufficiently large hole diameters (on the order of 200 microns or larger). The microchannels in the monoliths may be circular, hexagonal, rectangular, square, or other shapes. The microchannels may be formed through means known in the art, e.g., extrusion or molding. The microchannels in the heat exchanger may be the same shape as those in the monolith, although it is not required that they be the same. The characteristic channel dimension in both the heat exchanger and the monolith will generally be the same or close to one another. In some circumstances, it may be helpful to place a very thin polymer coating onto the gas distributor prior to drilling microholes, as doing so can provide lubrication, help position the drill microbits in the proper direction on the surface, and inhibit breakage of slender and fragile microbits.

Optionally, the catalyst may be located directly on the wall of, or may otherwise be incorporated into, the heat exchanger(s), in which case separate monolith layers may not be necessary.

The catalyst support may be a ceramic monolith as otherwise known in the art, or it may be replaced by an alternative catalyst support as otherwise known in the art, for example a metal foam. A metal foam catalyst, for example, may be used to fill the channels, in which case the monolith itself may not be needed.

The reactor may operate in a batch mode with liquid in the reactor and a feed of a gas supply; or in continuous mode as described previously, with gas and liquid flowing co-current or countercurrent. The amplitude of oscillation should preferably be set so that the fluid volume displaced within the reactor is close to or greater than the total volume of the channels (in the monoliths, heat exchangers, and plenums).

EXAMPLE 6

A prototype embodiment modeled catalysis reactors and reactions through visual observation and photography of the behavior of air bubbles forced through the acrylic-sided monolith reactor depicted in FIG. 6. The photographs are not included here, because photographs often do not reproduce well in an issued patent or published patent application. The observed results are instead described qualitatively.

Before we developed the novel reactor design that is disclosed here, we had previously encountered considerable difficulty in non-uniform gas flow through the several microchannels of the reactor monolith. It is desirable to have a large number of channels to enhance overall catalyst surface area. However, we observed that when gas was injected through a single (closed) gas plenum into the bottom of a monolith more than three channels in width (as depicted in FIG. 10), there was only minimal back flow of liquid into the channels during the down stroke of the piston. If liquid does not flow into the channels, then catalyzed reaction between gas and liquid is substantially diminished. We found that in this system a large pressure head of liquid (~40 cm or greater) above the reactor was needed to promote sufficient back flow of liquid into the channels. Such a large pressure head and "excess" liquid volume are undesirable for industrial operation if they can be avoided. Efficient operation of the novel microchannel reactor with oscillatory forcing does not depend on a head of pressure (or volume of liquid) above the channels, which may accordingly be very low—even approaching zero. While the oscillatory forcing of a single "traditional" (or closed) gas plenum provided acceptable distribution of gas and liquid through the several channels of the monolith during the upstroke and downstroke (as depicted in FIG. 10), the system was still far from satisfactory as a working reactor, due to the need for a large liquid head to promote the transport of liquid into the channels during the downstroke. Furthermore, the reactor of this prior design was limited in width, which is undesirable for a working reactor.

EXAMPLE 7

The present invention overcomes these difficulties by, among other things, avoiding the need for a closed gas plenum. The microchannels are open on both ends of the reactor, so that liquid flows through the microchannels much more freely. Gas is injected directly into each of the microchannels, without closing off either end of the microchannels to liquid flow.

In a prototype embodiment, as shown in FIGS. 1-5, the reactor comprised layers of monoliths with microchannels suitable for holding catalyst, alternating with layers of microchannel heat exchangers. The channels in the heat exchangers are aligned with the microchannels of the monoliths. As shown in FIG. 5, in one of the heat exchangers, generally the bottom layer, the diameters of the channels are slightly smaller, though still aligned with the other channels, to leave room for very small holes in the wall of the heat exchanger to admit gas into the channels. These holes, which may be as small as ~75 to ~200 µm, may be formed through techniques known in the art, including mechanical drilling with a microbit, or perforation by laser. These microholes may be so small that they are difficult or impossible to see with the unaided eye. Because the wall of the heat exchanger may itself be quite thin, the introduction of such small holes is readily accomplished. Note that in this design, the "heat exchanger" layers may be used for heat exchange—either to heat or cool the reaction—or, with the addition of micro-outlets, for admitting gas to the microchannels. A closed gas plenum, as shown in the earlier prototype device depicted in FIG. 10, is preferably not used. Active forcing of the prototype embodiment depicted in FIGS. 1-5, with a piston positioned in the liquid outside (and below) the reactor produced uniform flow of gas and uniform flow of liquid in every microchannel, as confirmed by visual observation and by high-speed photography. During upstroke, gas rapidly filled each channel. During downstroke, liquid rapidly flowed back into each channel.

EXAMPLE 8

We measured the uptake of oxygen from air bubbles into water with the prototype apparatus depicted in FIG. 6. This test system directly measured the interaction between gas and liquid in the novel reactor. These transport measurements give insight into future catalysis reactor performance. The microchannel assembly reactor of FIG. 6(a) was used in a bubble column. The microchannel assembly was operated both with and without oscillatory forcing. The uptake of oxygen from air bubbles into water was measured with a dissolved oxygen probe. The water had previously been purged of dissolved oxygen by bubbling with nitrogen.

The volumetric mass transfer coefficient was determined by measuring dissolved oxygen in the bulk phase of the bubble column as a function of time. The incremental rate $\Delta R$ for oxygen transfer into the liquid phase of a bubble column (moles per second) is given as the product of the volumetric mass transfer coefficient $k_L a$, times the linear composition driving force, times the incremental volume $A\Delta Z$:

$$\Delta R = k_L a'(C^* - C) A \Delta z \qquad (1)$$

where $C^*$ and $C$ denote oxygen solubility and measured dissolved oxygen concentration (moles of solute/cc liquid), respectively. A solute balance on the liquid phase states that the rate of accumulation equals the rate of transfer:

$$A \Delta z (1 - \varepsilon) \frac{dC}{dt} = k_L a'(C^* - C) A \Delta z \qquad (2)$$

where $\varepsilon$ is the fractional gas volume (or void) in the column, and $(1-\varepsilon)$ is the fractional liquid volume. Simplifying yields the first order equation:

$$(1 - \varepsilon) \frac{dC}{dt} = k_L a'(C^* - C) \qquad (3)$$

Integrating equation (3) yields:

$$C(t) = C^* - (C^* - C_0) \exp\left(-\frac{k_L a'}{(1-\varepsilon)} t\right) \qquad (4)$$

where $C_0$ ($C$ at $t=0$) is the initial oxygen concentration. Rearranging yields a dimensionless, normalized dissolved oxygen concentration as a function of time and mass transfer coefficient, which for $C_0 = 0$ is:

$$\frac{C(t)}{C^*} = 1 - \exp\left(-\frac{k_L a'}{(1-\varepsilon)} t\right) \qquad (5)$$

Combining the liquid fraction with a' yields:

$$\frac{C(t)}{C^*} = 1 - \exp(-k_L a t) \qquad (6)$$

where, for spherical bubbles, $a = (6/d_B)(\varepsilon/(1-\varepsilon))$, since $a' = 6\varepsilon/d_B$, where $d_B$ is the bubble diameter. The unknown factor $k_L a$ was determined from the experimental measurements by minimizing the sum of the squares of the differences between measured and predicted normalized concentrations. Oxygen concentration was measured every 0.33 seconds.

Figure 11A:
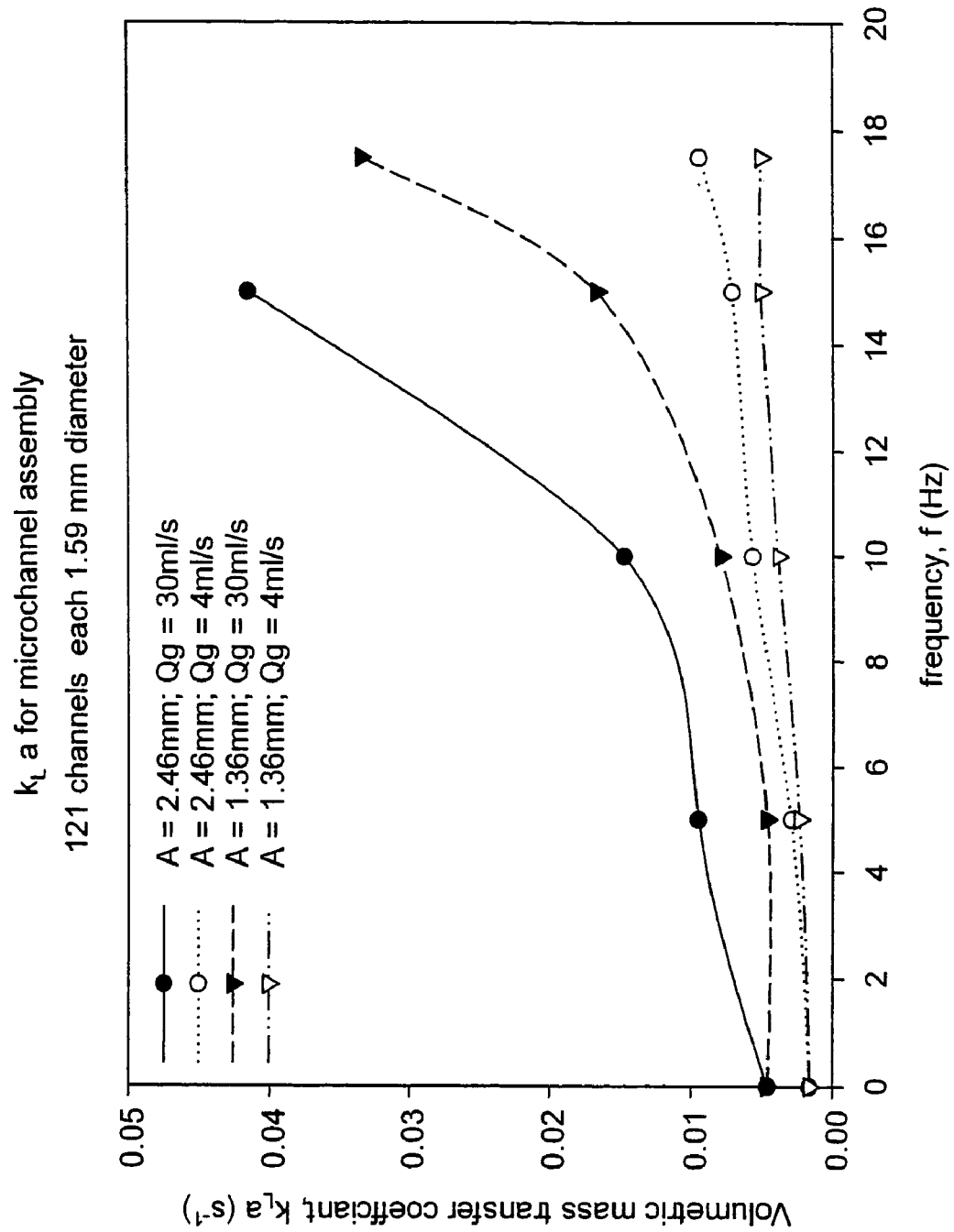
FIGS. 11(a) and 11(b) depict measured $k_L a$ values, and relative enhancement of those values from oscillatory forcing, in oxygen uptake experiments.

FIG. 11(a) depicts the results of the oxygen uptake experiments, the measured $k_L a$ values obtained with the prototype apparatus depicted in FIG. 6. With no forcing, the $k_L a$ value was 0.0017 sec$^{-1}$ at a 4 ml/s gas flow rate, and 0.0047 sec$^{-1}$ at 30 ml/s.

Oscillatory forcing substantially increased the measured $k_L a$ values, in some cases by an order of magnitude. For example, with a 30 ml/s gas flow, and a 2.46 mm oscillation amplitude at 15 Hz using a solid piston, $k_L a$ was 0.0414 sec$^{-1}$.

Figure 11B:
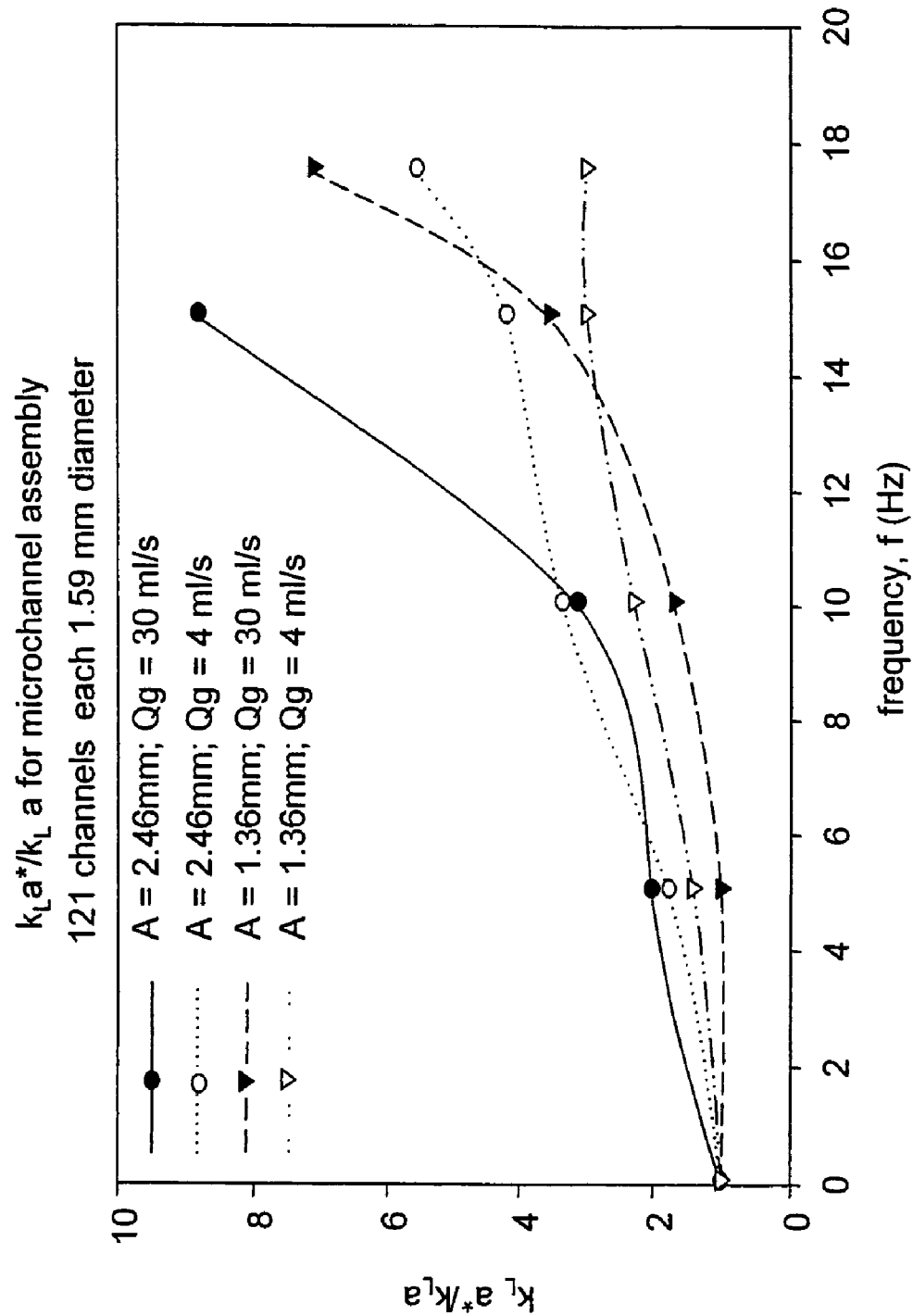

FIG. 11(b) depicts the enhancement factor from oscillatory forcing, the ratio of $k_L a$ with forcing (denoted $k_L a^*$) to $k_L a$ without forcing (i.e., at 0 Hz, under otherwise identical conditions). Oscillatory forcing enhanced mass transfer in all cases, and under some conditions produced an order-of-magnitude increase in the mass transfer coefficient. For example, at 30 ml/s gas flow, and 2.46 mm piston displacement amplitude, the enhancement factor ($k_L a^*/k_L a$) at 15 Hz was 8.81. We believe that the enhancement resulted both from increased liquid movement through the channels, and from bubble breakage in the channels caused by gas and liquid mixing. Visual observations revealed a large increase in the number of bubbles generated during oscillatory forcing. These measurements demonstrated the substantially enhanced mixing, the substantially enhanced gas-liquid contact, that could be achieved through the present invention.

EXAMPLE 9

We have estimated the power required to operate the forced microchannel assembly, and have compared the required power to that for a bulk stirred vessel with the same mass transfer coefficient. The total power (Watts/unit mass) supplied to the microchannel reactor is the sum of the power supplied by the gas flow plus that supplied by the external oscillation, $$\frac{\text{Power}}{\text{Unit Mass}} = (U_{og})(g) + \frac{A^2 \omega^3}{2} \quad (7)$$

Where $U_{og}$ is the gas superficial velocity (m/s), g is the acceleration due to gravity (m/s²), A is the amplitude of oscillation (m) and $\omega$ is the angular frequency of oscillation (s⁻¹). To obtain the power per unit volume we multiply equation (7) by the fluid density.

For an agitated vessel, $k_L a$ may be estimated as:

$$k_L a = 0.026 \left(\frac{\text{Power}}{\text{Volume}}\right)^{0.4} U_{og}^{0.5} \quad (8)$$

Figure 12:
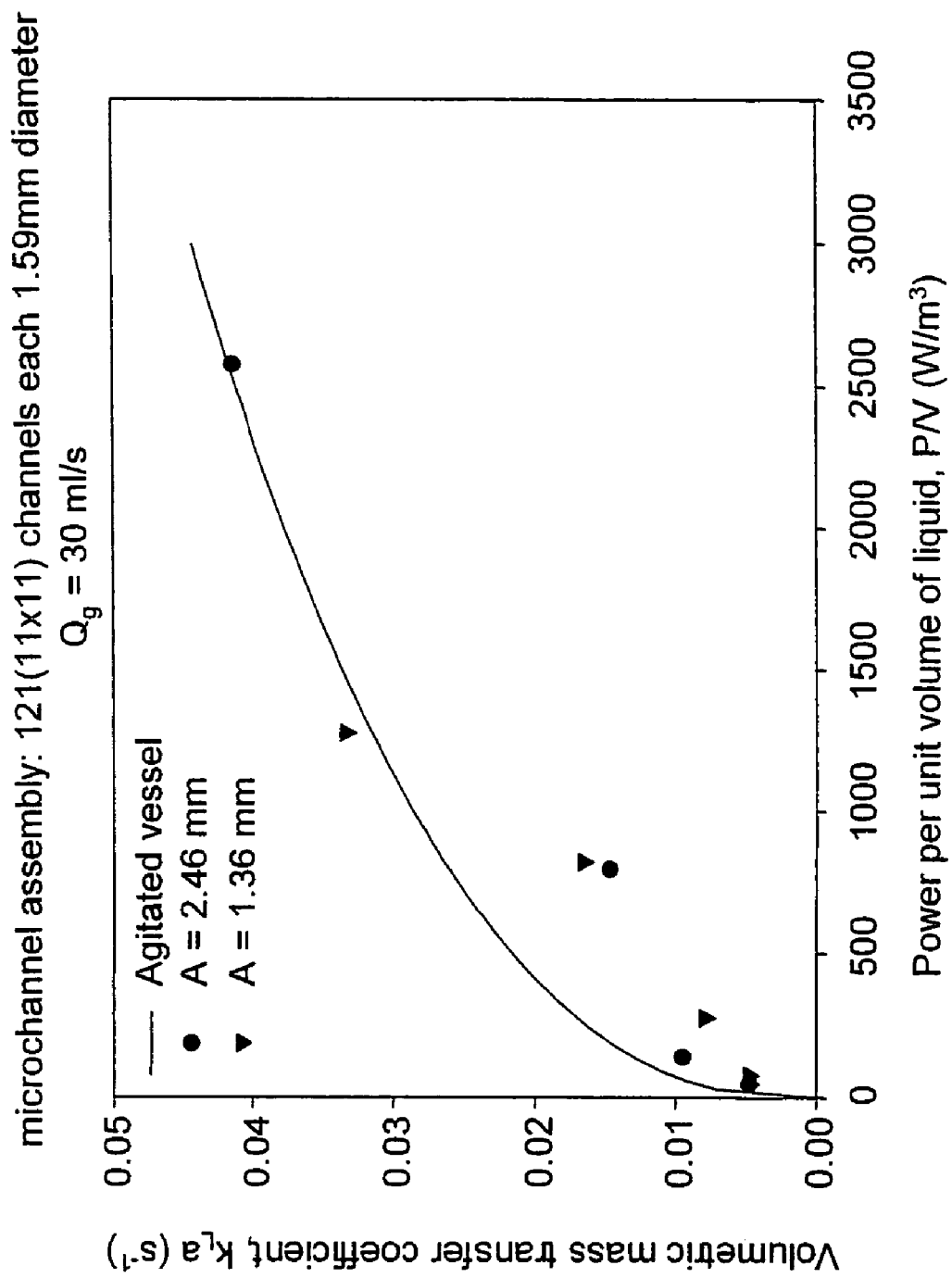
FIG. 12 compares mass transfer coefficients for a bulk stirred tank and a microreactor in accordance with the present invention.

The solid line in FIG. 12 plots equation (8) at the high gas flow rate ($Q_g$=30 mL/s) of FIG. 11. Data from FIG. 11 for the high gas flow rate ($Q_g$=30 mL/s) at amplitudes A=2.46 and A=1.36 are plotted in FIG. 12, using equation (7) to calculate the power input. Surprisingly, the forced microchannel reactor had mass transfer coefficients that were nearly the same as those for an agitated bulk vessel with equivalent power input. It is important to appreciate that bubble creation and turbulent mixing in the microreactor occur primarily in the microchannels, while in the agitated vessel the mixing occurs in the bulk phase. This is a surprising result; it has not previously been thought to be feasible to obtain the equivalent of bulk phase mixing inside microchannels.

While the invention has been described primarily in the context of a gas-liquid-solid catalyst system, it may also be used for a liquid-liquid-solid catalyst system. Such a system may be particularly useful where it is desired to react to immiscible liquids with one another. The oscillatory forcing promotes mixing of the two liquids, rather than allowing them to segregate in the small channels. The microhole size, the oscillation frequency, and the oscillation amplitude may be adjusted to allow for the viscosity of the two liquids. The invention may also be used with other types of fluids, such as supercritical fluids or polymer melts.

The complete disclosures of all references cited in this specification are hereby incorporated by reference. Also incorporated by reference is the complete disclosure of the following thesis, which is not prior art to the present application: J. Ma, *Forced Bubble Columns*, Master's Degree Thesis, submitted to the graduate faculty of Louisiana State University in August 2003. In the event of an otherwise irreconcilable conflict, however, the present specification shall control.

What is claimed:

1. A device comprising:
   (a) a reactor comprising a substrate layer or a plurality of adjacent substrate layers; wherein:
       (i) said substrate layer or layers contain a plurality of channels;
       (ii) each channel has an inner diameter between about 0.1 and about 20 mm;
       (ii) each channel traverses each substrate layer; and each channel has a first opening on one side of said reactor and a second opening on another side of said reactor; such that each channel is adapted to allow liquid to flow into the channel's first opening, to flow substantially unimpeded through the interior of said reactor, and to exit from the channel's second opening; and such that each channel is adapted to allow liquid to flow into the channel's second opening, to flow substantially unimpeded through the interior of said reactor, and to exit from the channel's first opening; and
   (b) a plurality of inlets, wherein at least one said inlet corresponds to each channel; wherein each said inlet is located within or immediately adjacent to its corresponding channel; and wherein each said inlet is adapted to supply a fluid to its corresponding channel;
wherein:
   (c) said device is adapted to allow the efficient, oscillating flow of a liquid and a fluid through all of the channels, wherein the liquid and the fluid are not identical; wherein the flow of the liquid and the flow of the fluid result from oscillations imparted to the liquid, and wherein the flow of liquid through the channels occurs in the absence of a substantial head of liquid pressure above said reactor.

2. A device as recited in claim 1, additionally comprising a vessel adapted to hold said reactor, and adapted to hold a liquid in contact with the channel openings.

3. A device as recited in claim 1, additionally comprising an oscillator adapted to impart oscillations to a liquid in the vessel, wherein the oscillations have a frequency between about 0.1 Hz and about 100 Hz.

4. A device as recited in claim 3, wherein said oscillator comprises a rigid or flexible piston.

5. A device as recited in claim 3, wherein said oscillator comprises a pulsed source of a gas; and wherein the fluid is the gas provided by said pulsed source.

6. A device as recited in claim 1, additionally comprising one or more heat exchangers adapted to transfer heat to or from liquid in the channels.

7. A device as recited in claim 1, wherein each said inlet is adapted to supply a gas to its corresponding channel.

8. A device as recited in claim 1, wherein each said inlet is adapted to supply a liquid to its corresponding channel.

9. A device as recited in claim 1, wherein each channel has an inner diameter between about 0.5 and about 5 mm.

10. A device as recited in claim 1, wherein a catalyst is embedded in or adsorbed onto the surface of at least some of the channels.

11. A process for mixing a liquid and a fluid, wherein the liquid and the fluid are not identical; said process comprising the steps of:

(a) supplying the liquid to a device that comprises:
  (i) a reactor comprising a substrate layer or a plurality of adjacent substrate layers; wherein:
    (A) the substrate layer or layers contain a plurality of channels;
    (B) each channel has an inner diameter between about 0.1 and about 20 mm;
    (C) each channel traverses each substrate layer; and each channel has a first opening on one side of the reactor and a second opening on another side of the reactor; such that each channel is adapted to allow liquid to flow into the channel's first opening, to flow substantially unimpeded through the interior of the reactor, and to exit from the channel's second opening; and such that each channel is adapted to allow liquid to flow into the channel's second opening, to flow substantially unimpeded through the interior of the reactor, and to exit from the channel's first opening; and
  (ii) a plurality of inlets, wherein at least one inlet corresponds to each channel; wherein each inlet is located within or immediately adjacent to its corresponding channel; and wherein each inlet is adapted to supply a fluid to its corresponding channel;

(b) supplying the fluid to the inlets; and (c) applying and oscillating force to the liquid to cause the liquid to oscillate through the channels in the absence of a substantial head of liquid pressure above the reactor; wherein the resulting oscillations cause the liquid and the fluid to mix with one another with substantially greater efficiency than the liquid and the fluid would mix in otherwise identical circumstances without the oscillations; and wherein the liquid and the fluid flow through substantially all the channels.

12. A process as recited in claim 11, wherein the oscillations have a frequency between about 0.1 Hz and about 100 Hz.

13. A process as recited in claim 11, wherein the oscillations are induced by a rigid or flexible piston.

14. A process as recited in claim 11, wherein the oscillations are induced by a pulsed source of a gas; and wherein the fluid is the gas provided by the pulsed source.

15. A process as recited in claim 11, wherein the fluid is a gas.

16. A process as recited in claim 11, wherein the fluid is a liquid.

17. A process as recited in claim 11, wherein the fluid is a polymer melt.

18. A process as recited in claim 11, wherein the fluid is a supercritical fluid.

* * * * *